United States Patent [19]

Akamine

[11] Patent Number: 5,580,827

[45] Date of Patent: Dec. 3, 1996

[54] CASTING SHARPENED MICROMINIATURE TIPS

[75] Inventor: Shinya Akamine, Stanford, Calif.

[73] Assignee: The Board of Trustees of the Leland Stanford Junior University, Stanford, Calif.

[21] Appl. No.: 970,545

[22] Filed: Nov. 2, 1992

Related U.S. Application Data

[63] Continuation of Ser. No. 758,909, Sep. 11, 1991, abandoned, which is a continuation-in-part of Ser. No. 418,663, Oct. 10, 1989, abandoned.

[51] Int. Cl.⁶ .................................. H01L 21/302
[52] U.S. Cl. .................... 437/225; 437/228; 437/239; 437/249
[58] Field of Search ..................... 313/313, 336, 313/309; 156/647, 632, 641, 647.1, 632.1, 640.1; 437/22.8, 249, 250, 228 TI, 225, 239; 264/82, 162, 139

[56] References Cited

U.S. PATENT DOCUMENTS

| 3,970,887 | 7/1976 | Smith et al. | |
| 4,307,507 | 12/1981 | Gray et al. | 437/249 |
| 4,685,996 | 8/1987 | Busta et al. | 156/647 |
| 4,735,396 | 4/1988 | Hamakawa et al. | 156/647 |
| 4,916,002 | 4/1990 | Carver | 156/647 |
| 4,943,719 | 7/1990 | Akamine et al. | 156/647 |
| 4,964,946 | 10/1990 | Gray et al. | 156/643 |
| 5,051,379 | 9/1991 | Bayer et al. | 437/225 |
| 5,100,355 | 3/1992 | Marcus et al. | 156/662 |
| 5,201,992 | 4/1993 | Marcus et al. | 156/643 |

OTHER PUBLICATIONS

S. K. Gandhi, *VLSI Fabrication Principles*, John Wiley and Sons, New York, 1983, pp. 385–388.
R. B. Marcus et al., "The Oxidation of Shaped Silion Surfaces," *J. Electrochem. Soc. Solid State Science & Tech.*, Jun. 1982 pp. 1278–1282.

*Primary Examiner*—T. N. Quach
*Attorney, Agent, or Firm*—Flehr, Hohbach, Test, Albritton & Herbert

[57] ABSTRACT

Sharpened microminiature tips are produced by casting in a silicon/silicon dioxide mold. The silicon dioxide layer is formed by exposing cavities in a single crystal substrate to an oxidizing species at a low temperature. Anomalous oxidation of silicon results in a differential thickness in the silicon dioxide layer, providing a convex contour on the surface of the cavities, leading to a sharpened end. The tip can be made from any kind of material that can be cast in a silicon mold. The sharpened tip can be integrated with a member to form a cantilever. An improved scanning probe microscope can be built with the sharpened tip in the cantilever structure.

17 Claims, 6 Drawing Sheets

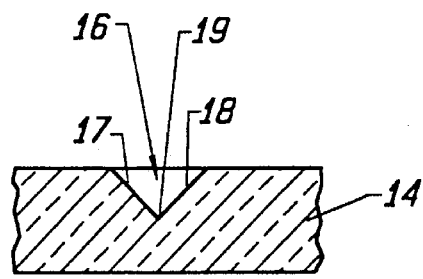
FIG. 2A
*(PRIOR ART)*
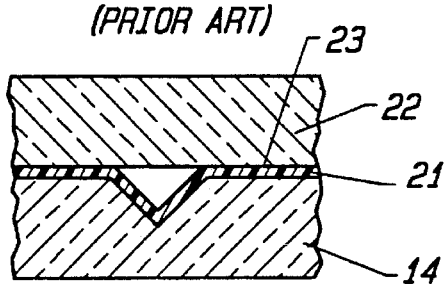
FIG. 2B
*(PRIOR ART)*
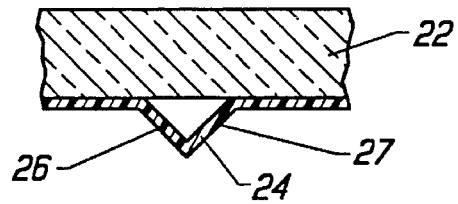
FIG. 2C
*(PRIOR ART)*
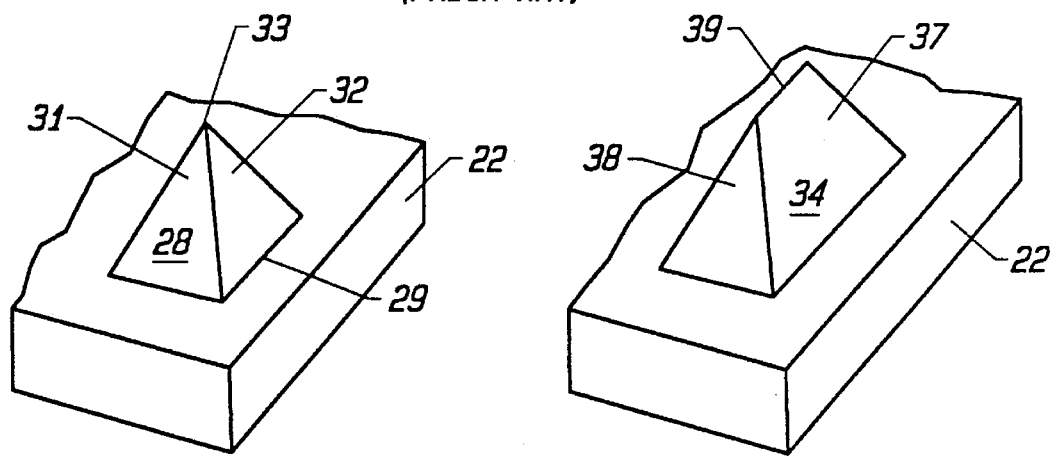
FIG. 3A
*(PRIOR ART)*
FIG. 3B
*(PRIOR ART)*

CASTING SHARPENED MICROMINIATURE TIPS

STATEMENT AS TO RIGHTS AND INVENTIONS MADE UNDER FEDERALLY-SPONSORED RESEARCH AND DEVELOPMENT

This invention was made with United States Government support under ONR/DARPA, Contract No. N00014-84-K-0624. The federal government may have rights in and to patents on this invention.

CROSS-REFERENCE TO RELATED APPLICATIONS

This application is a continuation of application Ser. No. 07/758,909, filed Sep. 11, 1991, now abandoned, which, in turn, is a continuation-in-part of application Ser. No. 07/418,663 filed Oct. 10, 1989 now also abandoned.

BACKGROUND OF THE INVENTION

1. Field of the Invention

This invention relates to the fabrication of microminiature tips, and more particularly, to a method of casting a microminiature tip that provides the same with a sharpened end and a desirable surface profile. It also relates to a tip so cast, and a scanning probe microscope incorporating the same.

2. Prior Art

Microminiature tips have many applications in scientific and engineering technology, such as for sensors and in actuators, vacuum microelectronics, microfluidics and microscopy. They are used either to focus current to a point or as a mechanical probe. Such tips traditionally have been very difficult to make in a consistent, reproducible manner. In this connection, for reliable operation in many situations it is important that the tip end be exceedingly sharp.

There is a paper by Marcus which discusses how to produce a sharpened silicon knife blade, "The Oxidation of Shaped Silicon Surfaces", *Journal of the Electrochemical Society, Solid-state Science and Technology*, June, 1982, pp. 1278–1282. Several publications exist in the field providing some background information on the manufacture of microminiature tips. One such paper is by Stephani, "Fabrication of Densely Packed Sharp Silicon Field Emitters Using Dry Etching Techniques", given at the Second International Conference on Vacuum Microelectronics, July 1989. Another such paper is by Marcus, "Formation of Silicon Tips with <1 nm Radius", *Applied Physics Letter*, Vol 56, No 3, Jan. 15, 1990, pp. 236–238.

Reliable, sharp tips are particularly needed for scanning probe microscopes, like scanning tunneling microscopes (STMs) and atomic force microscopes (AFMs). The ends of typical scanning probe microscopes either contact or are placed in close proximity to a surface to be imaged. Tips not only must be sharp, they most desirably also have surface contours that facilitate scanning. Insofar as sharpness is concerned, the radius of the tip end of a tip incorporated into either an STM or an AFM should be less than 500 Angstroms. In other words, it is desirable that scanning probe microscope tips terminate in a single atom. Relative to the tip surface profile, it will be recognized that in order to achieve high resolution, it is important that the remainder of the tip not interfere with appropriate positioning of such end.

There are various types of microfabrication processes for making tips by casting in prefabricated silicon molds. One of such processes is described in U.S. Pat. No. 4,916,002, entitled "Microcasting of Microminiature Tips". The process begins with the creation of a pyramidal pit in a silicon wafer by anisotropic etching of the silicon. The pit is then filled with a tip material such as silicon nitride or metal. The wafer is thereafter bonded to a second substrate, and the original substrate which embodies the mold is selectively etched away until the tip is exposed. In this type of process, the ultimate surface contour and sharpness of the resulting tip is determined primarily by the surface contour and sharpness of the mold. One of the disadvantages of this process is lack of reliability in mold contour and sharpness. Another disadvantage is that any deviation in the shape of the pit due to the natural process variations in a manufacturing environment can result in tips which terminate at a blade rather than a point, deleteriously affecting resolution obtainable with the tip.

Microminiature tips can also be made for attachment to the end of a member to form a cantilever. One process of making such a cantilever is illustrated in U.S. Pat. No. 4,943,719, entitled "Microminiature Cantilever Stylus". The process involves forming rectangular silicon posts on a (100) silicon substrate and etching the top of the posts to leave silicon tips at the corners of the remains of each of the silicon posts. Thereafter, a silicon dioxide cantilever with an integral tip is thermally grown over the silicon wafer and the sharp silicon tip. One disadvantage of this process is that a narrow profile on the resulting tip, in the form of a concave surface contour, is not achievable.

The applicant currently has another patent application pending that relates to a method of sharpening silicon tips that are already made. This application was filed on Oct. 10, 1989 and given Ser. No. 07/418,663, abandoned. It only teaches how to sharpen tips made of silicon, not other materials. Moreover, the application neither teaches nor suggests how one could form a tip initially with a desired sharpened end and a desired surface profile. It only teaches how to improve silicon tips that are already made.

SUMMARY OF THE INVENTION

It is therefore an object of the invention to provide a method for fabricating a microminiature tip with a sharpened end and with a desirable surface contour using any material for the tip which is suitable to be cast in a silicon mold.

It is another object of the invention to cast a microcantilever assembly having a cantilever.

It is a further object of the invention to produce an improved scanning probe microscope having a cast microminiature tip provided with a narrow profile on the tip body and an especially sharp end.

The invention has other objects and features which will become apparent from, or are set forth in more detail, in the following Description of the Preferred Embodiments and the accompanying drawing.

In accordance with these objects, the method of the invention includes defining a cavity in a single crystal silicon substrate, the cavity having a shape which is generally the female equivalent of the shape desired for a microminiature tip. A layer of silicon dioxide is then formed in the cavity by exposing the silicon to an oxidizing species, such as oxygen or steam, at a temperature appropriate to form an oxide layer with differential thickness. The differential thickness is selected to provide a mold cavity with a convex surface contour on the cavity leading to a sharpened end. Suitable material is then deposited into the mold cavity to cast a tip with the shape defined by the silicon dioxide layer.

Another aspect of the present invention provides a method for fabricating a microminiature tip assembly in which the tip is integrally attached to the end of a cantilever. A layer of the material from which the cantilever is to be formed is first coated on a surface of a single crystal silicon substrate. An opening in the material layer is then formed to expose a selected area of the surface of the silicon substrate. A cavity, having a shape which is generally the female equivalent of the shape desired for the tip, is then defined in the selected area of the silicon substrate. Next a layer of silicon dioxide is formed in the cavity, for the formation of a sharpened end on the tip, by exposing the silicon to an oxidizing species at a temperature appropriate to form an oxide layer with differential thickness, thereby providing a desired silicon/silicon dioxide mold cavity. Thereafter, a tip material is deposited into the mold cavity to cast the tip with the shape of the sharpened end defined by said silicon dioxide layer, and to provide a patterned coupling between the tip and the material layer, creating a cantilever with the tip. The silicon dioxide and the silicon substrate surrounding the tip is then removed, leaving a freestanding cantilever with a sharpened microminiature tip.

The invention also provides an improved scanning probe microscope, using a microminiature tip having a narrow profile, in combination of other elements of the scanning probe microscope. A microminiature tip fabricated in accordance with the invention has a sharpened end which improves the resolution of the scanning probe microscope. Furthermore, the desirable concave surface contour improves the tips' access to the bottom of surface asperities or apertures, without interference from the wall of such apertures.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 2A to 2C are cross-sectional views illustrating the fabricating of microminiature tips using a conventional silicon mold.

FIGS. 3A and 3B are perspective views of a pyramidal tip terminating, respectively, in a point and a blade.

DESCRIPTION OF THE PREFERRED EMBODIMENTS

Oxidation of silicon occurs when an oxygen molecule of an oxidizing species, such as oxygen, steam or other water vapor, contacts a silicon molecule on the silicon surface. After a few hundred Angstrom initial layer of silicon dioxide ($SiO_2$) is formed, further oxidation can take place only if additional oxidizing molecules can diffuse through the existing silicon dioxide layer. The additional oxidizing molecules must diffuse to the boundary between the silicon dioxide layer and the silicon itself to take part in a reaction where the oxygen combines with the silicon. As the oxidation reaction progresses, the silicon dioxide layer becomes so thick that virtually no new silicon dioxide forms, even at elevated temperatures and over extended periods of time.

Silicon dioxide formed on silicon at low temperatures between 850°–1,000° C., has a higher compressive stress (in the oxide) on a corner surface than on flat surfaces. It is believed that the higher compressive stress within the oxide has a depressing effect on diffusivity of the oxidizing species into the silicon, resulting in a reduced oxidation rate and therefore a decreased oxide thickness on a corner surface as compared to a flat surface. See, for example, R. B. Marcus and T. T. Sheng, "The Oxidation of Sharp Silicon Surfaces," *Journal of the Electro-Chemical Society*, June 1982, pages 1278–1282.

Figure 1:
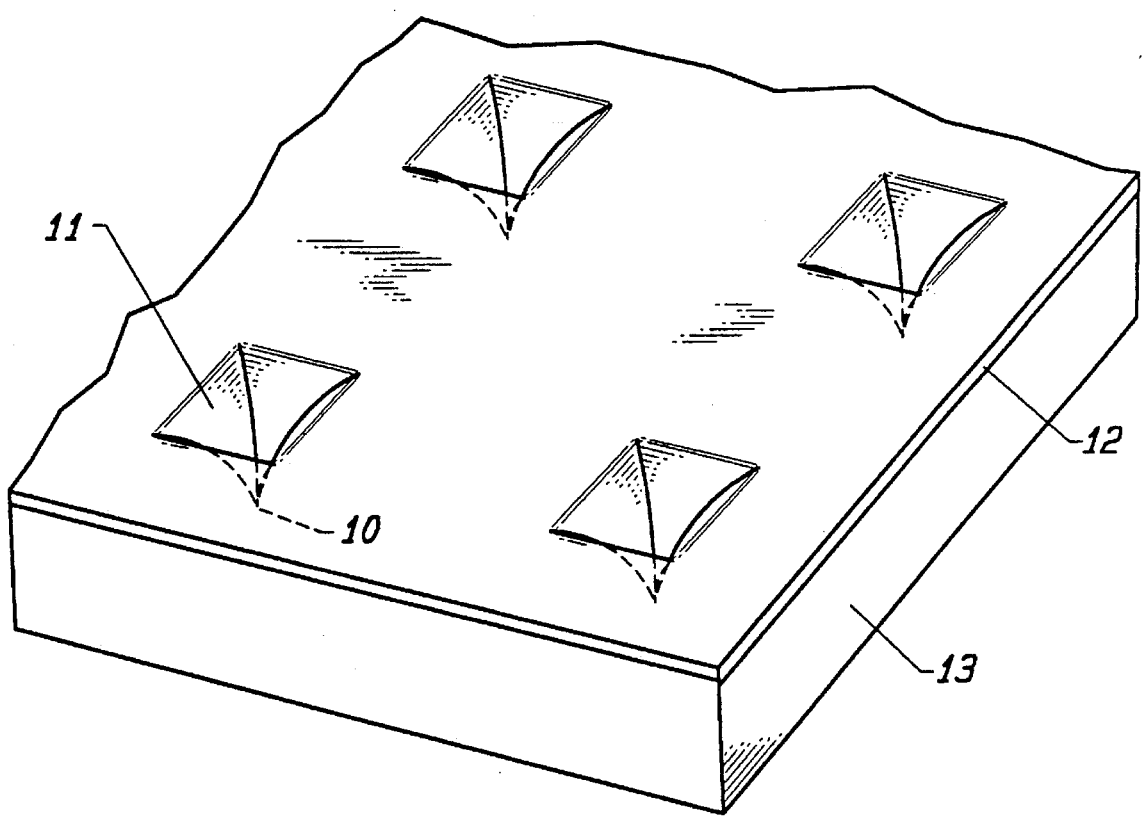
FIG. 1 is a perspective view of a portion of an array of silicon mold cavities having a layer of silicon dioxide.

FIG. 1 illustrates a portion of an array of silicon dioxide mold cavities for fabricating a plurality of tips simultaneously. The array includes a silicon substrate 13 having cavities, each of which is generally the female equivalent of the shape desired for a microminiature tip. A layer of silicon dioxide 12 is grown on the cavity walls 11 and the top surface of the silicon substrate 13. Such layer has differential thickness providing a convex surface contour terminating in a sharpened end 10. A microminiature tip made from each of these molds will therefore have a concave surface contour and a correspondingly sharpened end. An array of silicon/silicon dioxide mold cavities provides a significant increase in the yield and throughput of tip making by processing a plurality of tips and/or cantilever tip assemblies at the same time, making it suitable for mass production.

FIGS. 2A to 2C illustrate the formation of a microminiature tip using the conventional method of casting the tip in a single crystal silicon mold. The process begins with the creation of a pyramidal pit in a (100) silicon substrate by anisotropic etching of the silicon. FIG. 2A shows a silicon substrate 14 with a pit 16 created in the same. Pit 16 has relatively flat surfaces 17 and 18 converging to an end 19. The pit is then filled with a tip material 21, as shown in FIG. 2B. Silicon substrate 14 is thereafter bonded to a second substrate 22. FIG. 2C shows tip 24 exposed, with the base portion 23 bonded to the second substrate 22, after the original silicon substrate 14 has been selectively etched away. FIG. 2C also shows that the side surface profiles 26 and 27 are flat, matching those of surfaces 17 and 18 on pit 16 in the silicon substrate 14.

FIG. 3A illustrates a pyramidal tip 28 cast by the conventional silicon mold. Tip 28 has a square base 29 and relatively flat side surfaces 31 and 32 which, together with the rest of the surfaces, terminate in a point 33. It is desirable to have a tip that terminates in a point.

FIG. 3B illustrates a tip 34 cast into a poorly formed silicon mold, which often times occurs in a manufacturing environment due to process variations, resulting in the tip 34 having relatively flat side surfaces 37 and 38, which together with the rest of the surfaces, terminate in a blade 39. Such tips are often undesirable in applications where a point contact is required.

Figure 4A:
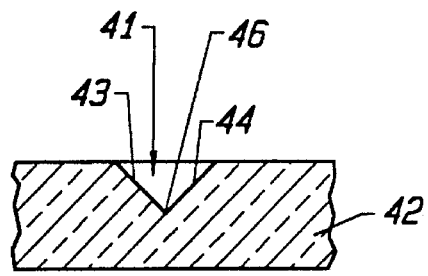
FIGS. 4A to 4D are cross-sectional views illustrating the fabrication of microminiature tips from a silicon/silicon dioxide mold cavity.
Figure 4B:
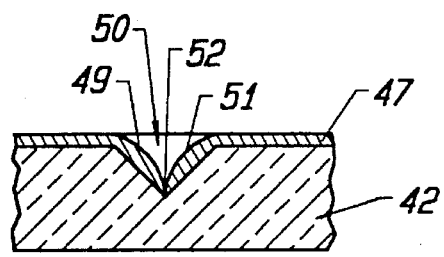

FIGS. 4A to 4D illustrate the formation of a microminiature tip in keeping with the invention. Even though the tip is cast, it is provided with a free end that is sharpened relative to cast tips in the past. It also has a desirable concave surface contour. FIG. 4A shows a cavity 41 having a shape which is generally the female equivalent of the shape desired for the tip defined on a (100) single crystal silicon substrate 42. It can be formed conventionally. One of the methods to form the same is to use anisotropic etching of the silicon. The cavity has relatively flat cavity walls 43 and 44 converging towards the cavity bottom 46 as in the past. In accordance with the invention, a layer of silicon dioxide 47 with a thickness of 500 to 10,000 Å is then grown on the surface of the cavity. It is shaped via differential thickness to provide a mold cavity having the desired shape for tip casting. This is shown in FIG. 4B.

Figure 4C:
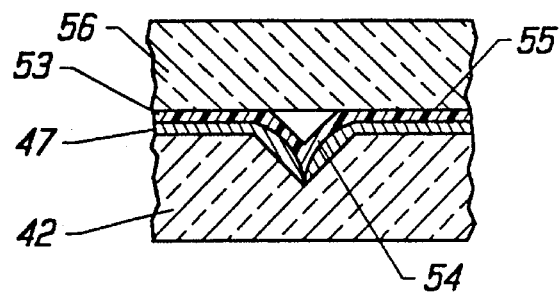
Figure 4D:
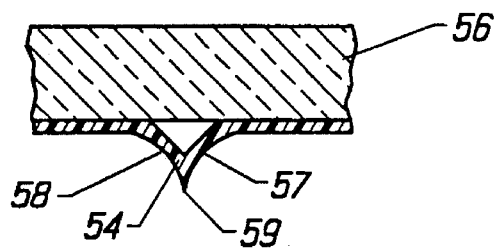

The layer of silicon dioxide 47 is formed by exposing the silicon 42 to an oxidizing species such as oxygen or steam, at a temperature in the range of 850° to 1,000° C. The anomalous oxidation of silicon at low temperature discussed above results in the differential thickness in the silicon dioxide layer with a much thicker layer formed on the side surfaces 43 and 44 than on the bottom of the cavity 46 and its immediate vicinity. This differential thickness creates a silicon/silicon dioxide mold cavity 50 having a more convex contour on its surfaces 49 and 51, than that of the original silicon cavity surfaces, for example 43 and 44. Surfaces 49 and 51, together with other surfaces, converge to a sharpened end 52. FIG. 4C illustrates the deposition of tip material 53, such as silicon nitride or metal, into the mold cavity 50 to cast the tip 54 with the shape of the sharpened end 52. A second piece of substrate 56, which can be glass, metal or silicon, is then bonded to the base 55 of tip 54 to provide a support for the same. FIG. 4D shows the sharpened silicon tip after the silicon substrate 42 and the silicon dioxide layer 47 have been selectively etched away subsequent to the hardening of the tip material. As illustrated, the tip 54 has concave contour surfaces 57 and 58, converging to form a sharpened end 59.

Figure 5A:
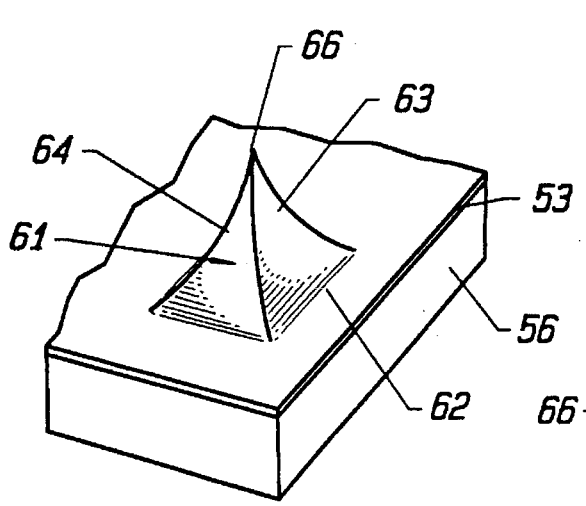
FIGS. 5A to 5B are a perspective and a plan view, respectively, of a pyramidal tip terminating in a point according the invention.
Figure 5B:
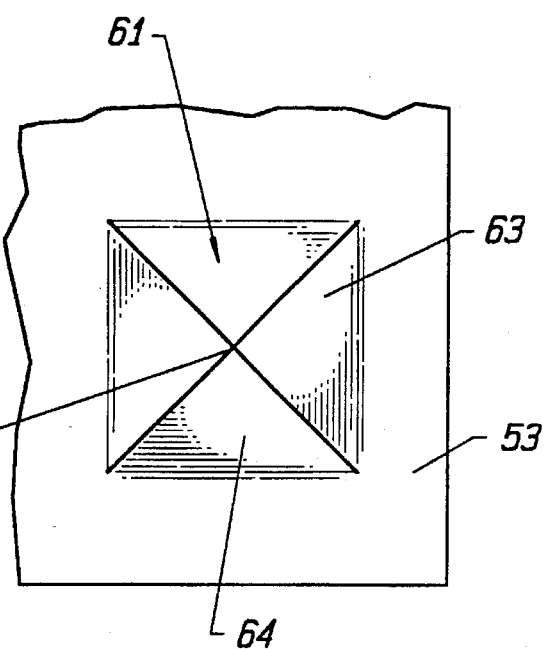

FIG. 5A illustrates a pyramidal tip 61 formed using the claimed invention. The tip 61 has a square base 62 on a substrate 56 and concave contour side surfaces 63 and 64, which together with the rest of the surfaces, terminate in a sharpened point 66. The surface contour of the tip is the male equivalent of surface 49 and 51 of the silicon dioxide layer 47 on the silicon pit 41, formed before the deposition of the tip material 53 as shown in FIGS. 4A and 4B. It is desirable to have a tip that terminates in a point. FIG. 5B shows a plan view of pyramidal tip 61.

Figure 5C:
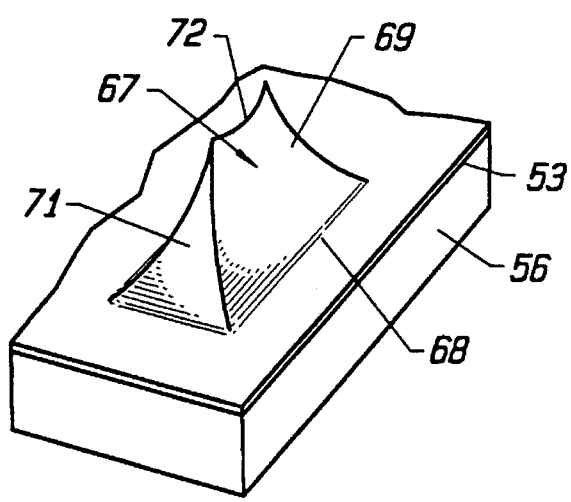
FIGS. 5C to 5D are a perspective and a plan view, respectively, of a pyramidal tip terminating in a concave blade according to the invention.
Figure 5D:
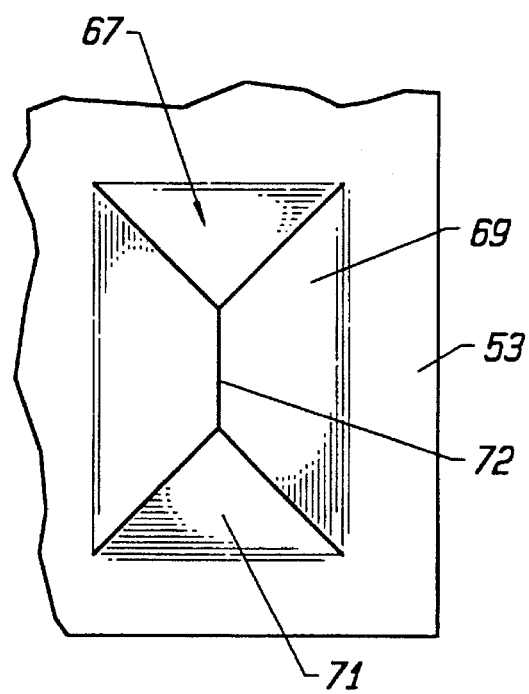

FIG. 5C illustrates a tip 67 formed using the claimed invention. It has a rectangular base 68 on a silicon substrate 42 and concave contour side surfaces 69 and 71 which, together with the rest of the surfaces, terminates in a somewhat concave line or blade 72. A blade terminated tip provides broader line contact and results in a reduction in contact impedance. Such tips are desirable in electrical applications where low contact impedance is required, as well as in vacuum microelectronics where such a structure reduces noise in emission current.

Figure 6A:
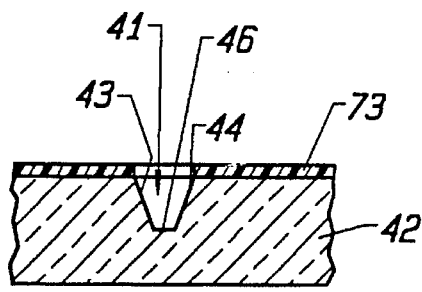
FIGS. 6A to 6E are sequential views of processing steps in the fabrication of a tip assembly which includes a cantilever.
Figure 6B:
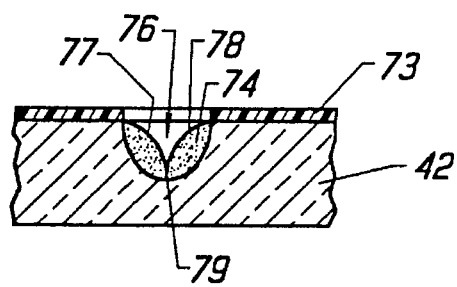
Figure 6C:
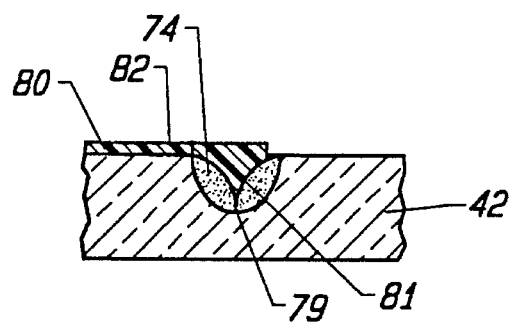

FIGS. 6A to 6E illustrate the formation of microminiature tip assemblies by casting the tip in a mold and then forming a member which attaches to the tip to form a cantilever. FIG. 6A shows a predetermined surface of a single crystal silicon substrate 42 coated with a masking layer 73 of material, such as silicon nitride or metal. An opening is then formed on layer 73 to expose a selected area of the surface on the substrate 42. Subsequently, a cavity 41 is formed on the silicon substrate 42 in the exposed area. It has relatively flat cavity walls 43 and 44 converging towards a bottom 46. In accordance with the invention, a layer of silicon dioxide 74 with a thickness of 500 to 10,000 Å is then grown on cavity 41 at the portion shaped for the formation of a sharpened end on the tip as shown in FIG. 6B. The layer of silicon dioxide 74 is formed by exposing the silicon substrate 42 to an oxidizing species, such as oxygen or steam, at a temperature in the range of 850° to 1,000° C. The anomalous oxidation of silicon at low temperature results in a differential thickness in the silicon dioxide layer with much thicker layer of silicon dioxide formed on the surfaces 43 and 44 than that on the bottom of the cavity 46. This differential thickness in silicon dioxide creates a silicon/silicon dioxide mold cavity 76 having more convex contour on its surface 77 and 78, than that of the original silicon cavity surfaces, for example 43 and 44. Surfaces 77 and 78, together with other surfaces, converge to a sharpened end 79. Mask layer 73 is then removed. Next, as shown in FIG. 6C, tip material 80 is deposited into mold cavity 76 to cast tip 81 with the shape of sharpened end 79. Tip material 80 is also deposited to form a cantilever 82. Alternatively, one patterned layer could be deposited for the cantilever and another distinct material deposited for the tip. However, a one piece structure is likely to be stronger.

Figure 6D:
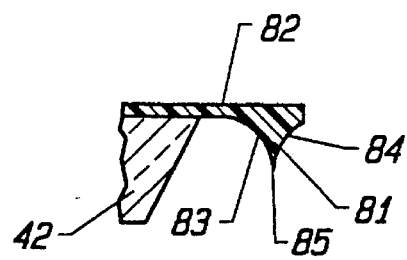
Figure 6E:
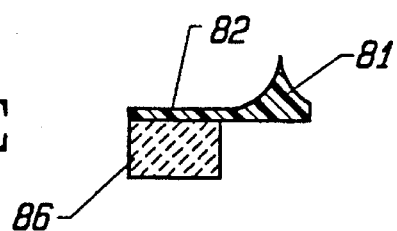

FIG. 6D shows a freestanding cantilever 82 with a sharpened tip end 85 exposed after the silicon dioxide layer 74 and selective portions of the silicon substrate 42 have been removed. The tip 81 has concave contour surfaces 83 and 84, converging to form the sharpened end 85. FIG. 6E shows another alternative of forming a freestanding cantilever by bonding a support 86, which can be glass, metal or silicon, to the cantilever while it is still attached to silicon dioxide layer 74 and silicon substrate 42. Silicon substrate 42 and silicon dioxide layer 74 are then removed to form a freestanding cantilever with support 86 on one end and sharpened tip 81 on the other.

Figure 7:
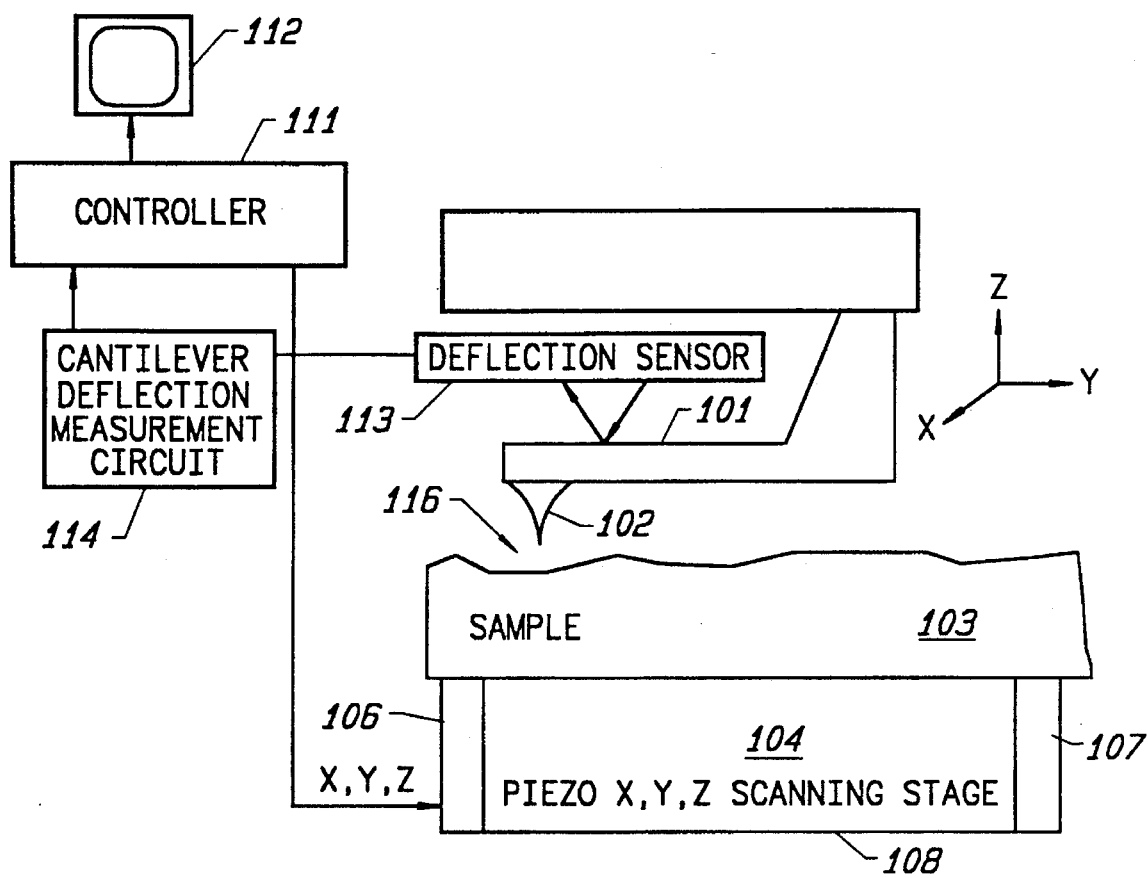
FIG. 7 is a representative schematic of an atomic force microscope.

FIG. 7 is a conceptual diagram of an atomic force microscope (AFM), a form of scanning probe microscope. In accordance with conventional practice, scanning provided by the AFM is similar to raster scanning. Scanning in the x and y directions is accomplished by an XYZ scanning stage 104. The sample 103 is supported by a pair of tubular piezoelectric scanners 106 and 107 which extend between a non-moving structure represented at 108 and the ends of the sample.

Scanning is controlled by a programmed microcontroller or computer 111 which also analyzes measurement data and displays measurement information on display 112. It should be mentioned that in some AFMs the sample surface is scanned by using an x,y,z translator to move the cantilever while keeping the sample stationary, and in others the cantilever is kept stationary while an x,y,z translator stage moves the sample.

In keeping with the invention, a microminiature cantilever arm 101 has a projecting tip 102 at its free end used to probe the surface of a sample 103. Tip 102 has a base from which a body portion extends to form a sharpened end with a concave contour along its length, terminating in a point. The concave contour of tip 102 provides a narrow profile for the tip surface suitable for accessing apertures and other asperities on the surface of sample 103 being scanned without touching the walls of such apertures and other asperities, thereby improving the resolution of the scanning.

The AFM of the invention is conventional in that it has a "contacting mode" of operation and a "non-contacting mode" of operation. In the contacting mode of operation, the tip 102 rides on the surface of the sample 103 with an extremely light tracking force, on the order of $10^{-5}$ to $10^{-10}$ N. Profiles of the surface topography are obtained with extremely high resolution. The concave contour of the tip surfaces aids in obtaining such resolution. Images showing the position of individual atoms at the surface of the sample are routinely obtained. In the second non-contacting mode of operation, the tip 102 is held a short distance, on the order of 5 to 500 Angstroms, from the surface of the sample and is deflected by various forces between the sample and the tip; such forces include electrostatic, magnetic, and van der Waals forces. The surface shape of the tip end aids in localizing the interatomic interactions. In either mode of operation, measurements of the sample's surface topology or other characteristics are obtained by measuring deflection of the cantilever 101. It is measured using a deflection sensor 113, typically using precisely aligned optical components, coupled to a deflection measurement circuit 114, although other techniques may be used.

Atomic force microscopy is capable of imaging conductive as well as insulating surfaces with atomic resolution. Typical AFMs have a sensitivity of 0.1 Angstrom in the measurement of displacement. Other types of scanning probe microscopes to which the invention is applicable include scanning tunneling microscopes and near field acoustic microscopes.

Figure 8A:
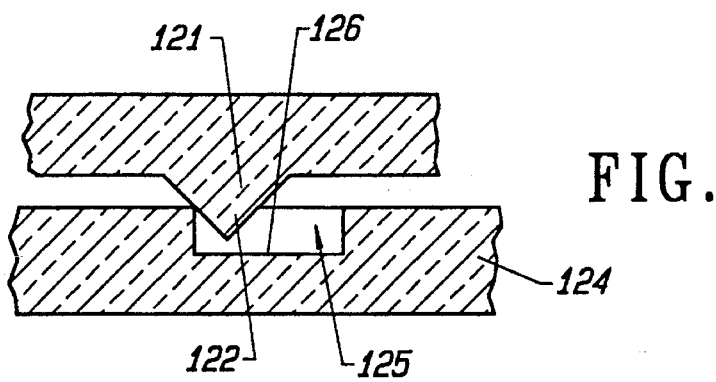
FIG. 8A is a cross-sectional view of a conventional microminiature tip and an aperture.

FIG. 8A shows a microminiature tip 121 cast from a conventional silicon mold, attempting to reach the bottom surface 126 of an aperture 125 formed in a structure 124. Since the contours of the sides of the tip end 122 are flat, they will touch the wall of aperture 125 so that the tip end 122 will fail to scan the portion of bottom surface 126 near aperture walls.

Figure 8B:
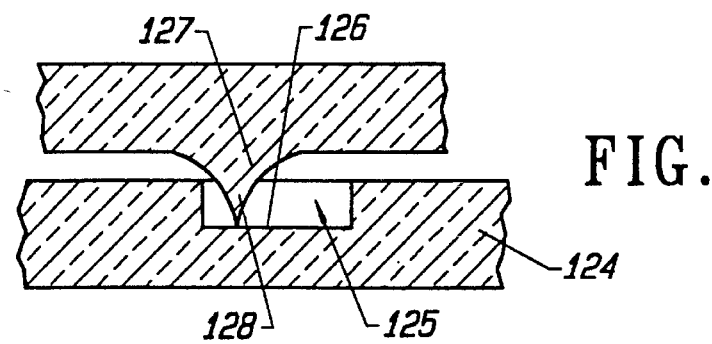
FIG. 8B is a cross-sectional view of a concave surface contour microminiature tip according to the invention and an aperture.

FIG. 8B shows a sharpened microminiature tip 127, cast using the claimed invention, reaching areas on bottom surface 126 of the same aperture 125 where the tip cast in a conventional silicon mold failed. Since the microminiature tip formed in accordance with the invention has a narrow profile because of its concave surface contour, its sharpened tip end 128 is able to scan bottom surface 126 of the aperture 125 closer to, yet without touching, the walls of the aperture.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in this art to best utilize the invention and various embodiments with various modification as are suited to the particular use contemplated. It is intended that the scope of the invention be defined by the claims appended hereto and their equivalents.

What is claimed is:

1. In fabricating a microminiature tip by casting the same in a mold, the steps of:

defining with a single crystal silicon substrate, a cavity which after the forming step of this method will provide a mold cavity having a shape which is generally the female equivalent of the shape desired for said tip;

forming a compressively stressed layer of silicon dioxide in said cavity at a portion thereof shaped for the formation of a sharpened end on said tip by exposing the silicon at a temperature in the range of 850° to 1,000° C., to an oxidizing species to provide a mold cavity having a convex contour; and thereafter depositing a tip material into said mold cavity, to cast said tip with the shape of said sharpened end defined by said silicon dioxide layer.

2. The method of claim 1 further including a step of bonding a support to said tip after the latter is cast.

3. The method of claim 1 further including the step of removing said silicon and said silicon dioxide layer from said tip material after it has hardened, to expose a sharpened microminiature tip.

4. The method of claim 1 wherein the oxidizing species is selected from the group consisting of oxygen and water vapor.

5. The method of claim 1 wherein the step of forming said layer of silicon dioxide provides said layer with thicknesses ranging from 500 to 10,000 Angstroms.

6. The method of claim 1 wherein all of the walls of the mold cavity are convex in shape as they converge towards the bottom of said cavity.

7. The method of claim 1 wherein the step of defining said cavity includes the step of anisotropic etching said single crystal silicon substrate.

8. The method of claim 1 wherein the tip material is selected from the group consisting of silicon nitride, polysilicon, aluminum, gold, tungsten and iridium.

9. The method of claim 1 wherein the fabrication of microminiature tips by casting the same in a mold includes the fabrication of a plurality of microminiature tips spaced apart on a single wafer of single crystal silicon having an array of silicon dioxide mold cavities.

10. In fabricating a microminiature tip assembly having a cantilever terminating in a microminiature tip provided with a free end, the steps of:

coating a predetermined surface of a single crystal silicon substrate with a layer of masking material;

forming an opening in said masking material layer to expose a selected area of said surface of said silicon substrate;

defining a cavity in said selected area of said wafer which after the layer forming step of this method will provide a mold cavity having a shape which is generally the female equivalent of the shape desired for said tip;

forming a compressively stressed layer of silicon dioxide in said cavity at a portion thereof shaped for the formation of a sharpened end on said tip by exposing the silicon at a temperature in the range of 850° to 1,000° C. to an oxidizing species selected from the group consisting of oxygen and steam to provide a silicon/silicon dioxide mold cavity having a convex contour; and thereafter depositing a layer of cantilever material onto said substrate and a tip material into said mold cavity, to cast a tip with the shape of said sharpened end defined by said silicon dioxide layer and to provide a patterned coupling between said cantilever material layer and said tip, creating a cantilever with said tip.

11. The method of claim 10 wherein said tip material and said cantilever material are identical.

12. The method of claim 10 further including the step of removing silicon and silicon dioxide to form a freestanding cantilever with a sharpened microminiature tip.

13. The method of claim 10 further including the step of bonding said cantilever to a support.

14. The method of claim 10 wherein all of the walls of said mold cavity are convex in shape as they converge towards the bottom of said cavity.

15. The method of claim 10 further including the step of:
   at a temperature in the range of 850° to 1,000° C., to an oxidizing species selected from the group consisting of oxygen and steam forming said layer of silicon dioxide with a thickness ranging from 500 to 10,000 Angstroms to form a silicon/silicon dioxide mold cavity having a convex contour for creating a sharpened end on said tip.

16. The method of claim 10 wherein the tip material is selected from the group consisting of silicon nitride, polysilicon, aluminum, gold, tungsten and iridium.

17. The method of claim 10 wherein the step of fabricating microminiature tip assemblies by casting the same in a mold includes the fabrication of a plurality of microminiature tip assemblies spaced apart on a single wafer of single crystal silicon.

* * * * *